United States Patent
Brandwine et al.

(10) Patent No.: US 11,477,183 B1
(45) Date of Patent: *Oct. 18, 2022

(54) APPLICATION-BASED MANAGEMENT OF SECURITY CREDENTIAL REVOCATIONS

(71) Applicant: Amazon Technologies, Inc., Seattle, WA (US)

(72) Inventors: Eric Jason Brandwine, Haymarket, VA (US); Rebecca Claire Weiss, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,720

(22) Filed: Jun. 29, 2020

(51) Int. Cl.
*H04L 9/40* (2022.01)

(52) U.S. Cl.
CPC ........ *H04L 63/067* (2013.01); *H04L 63/0838* (2013.01); *H04L 63/0876* (2013.01); *H04L 63/20* (2013.01)

(58) Field of Classification Search
CPC ............... H04L 63/067; H04L 63/0838; H04L 63/0876; H04L 63/20
See application file for complete search history.

(56) References Cited

U.S. PATENT DOCUMENTS

| | | | | |
|---|---|---|---|---|
| 9,483,627 | B1* | 11/2016 | Ferg | .................... H04W 12/069 |
| 2012/0254957 | A1* | 10/2012 | Fork | .................. H04L 63/0807 |
| | | | | 726/6 |
| 2012/0297190 | A1 | 11/2012 | Shen et al. | |
| 2013/0275748 | A1* | 10/2013 | Lu | ........................... G06F 21/31 |
| | | | | 713/155 |
| 2014/0082715 | A1 | 3/2014 | Grajek et al. | |
| 2014/0096213 | A1 | 4/2014 | Quan et al. | |
| 2014/0164776 | A1 | 6/2014 | Hook et al. | |
| 2016/0057107 | A1* | 2/2016 | Call | .................... H04L 63/0236 |
| | | | | 726/11 |

(Continued)

OTHER PUBLICATIONS

Wu et al., "Design and Implementation of Cloud API Access Control Based on OAuth", Apr. 2013, IEEE 2013 Tencon—Spring, pp. 485-489 (Year: 2013).*

(Continued)

*Primary Examiner* — Kenneth W Chang
(74) *Attorney, Agent, or Firm* — Nicholson De Vos Webster & Elliott LLP

(57) ABSTRACT

Techniques are described for enabling software applications to obtain temporary security credentials used to interact with a cloud provider network and, upon the revocation of an active set of temporary security credentials used by an application (e.g., due to concerns about the temporary credential's potential exposure to one or more unauthorized third parties), to readily obtain new temporary security credentials that the application can use to continue operation with minimal interruption. The temporary security credentials can be used, for example, to enable the cloud provider network to authenticate requests sent by software applications or users to various services or other components of the cloud provider network. An operator of a cloud provider network may provide a software development kit (SDK) that application developers can use to incorporate functionality related to the management of temporary security credentials.

20 Claims, 10 Drawing Sheets

(56) References Cited

U.S. PATENT DOCUMENTS

2017/0011214 A1    1/2017   Cavanagh et al.
2019/0075115 A1*   3/2019   Anderson ............. H04L 63/083
2019/0349405 A1*   11/2019  Bengtson ............. H04L 63/107
2019/0356661 A1*   11/2019  Hecht ................... H04L 9/0891

OTHER PUBLICATIONS

Liang et al., Man in the Cloud (MITC) Defender: SGX-based User Credential Protection for Synchronization applications in Cloud Computing Platform, Jun. 2017, IEEE 10th International Conference on Cloud Computing, pp. 302-309 (Year: 2017).
Notice of Allowance, U.S. Appl. No. 16/915,726, dated Sep. 28, 2021, 16 pages.

* cited by examiner

APPLICATION-BASED MANAGEMENT OF SECURITY CREDENTIAL REVOCATIONS

BACKGROUND

A cloud provider network enables users to use a variety of computing-related resources such as compute resources, storage resources, networking resources, and the like. When a user or application interacts with a cloud provider network (e.g., using an application programming interface (API) or command line interface (CLI) provided by the cloud provider network), the user or application typically is required to specify security credentials to indicate who the user or application is and whether the user or application has permission to access the requested resources. A cloud provider network in turn uses the security credentials to authenticate and authorize the user or application to perform various actions. The security credentials can include, for example, usernames and passwords, access keys, or the like.

BRIEF DESCRIPTION OF DRAWINGS

Various embodiments in accordance with the present disclosure will be described with reference to the drawings, in which.

DETAILED DESCRIPTION

Figure 1:
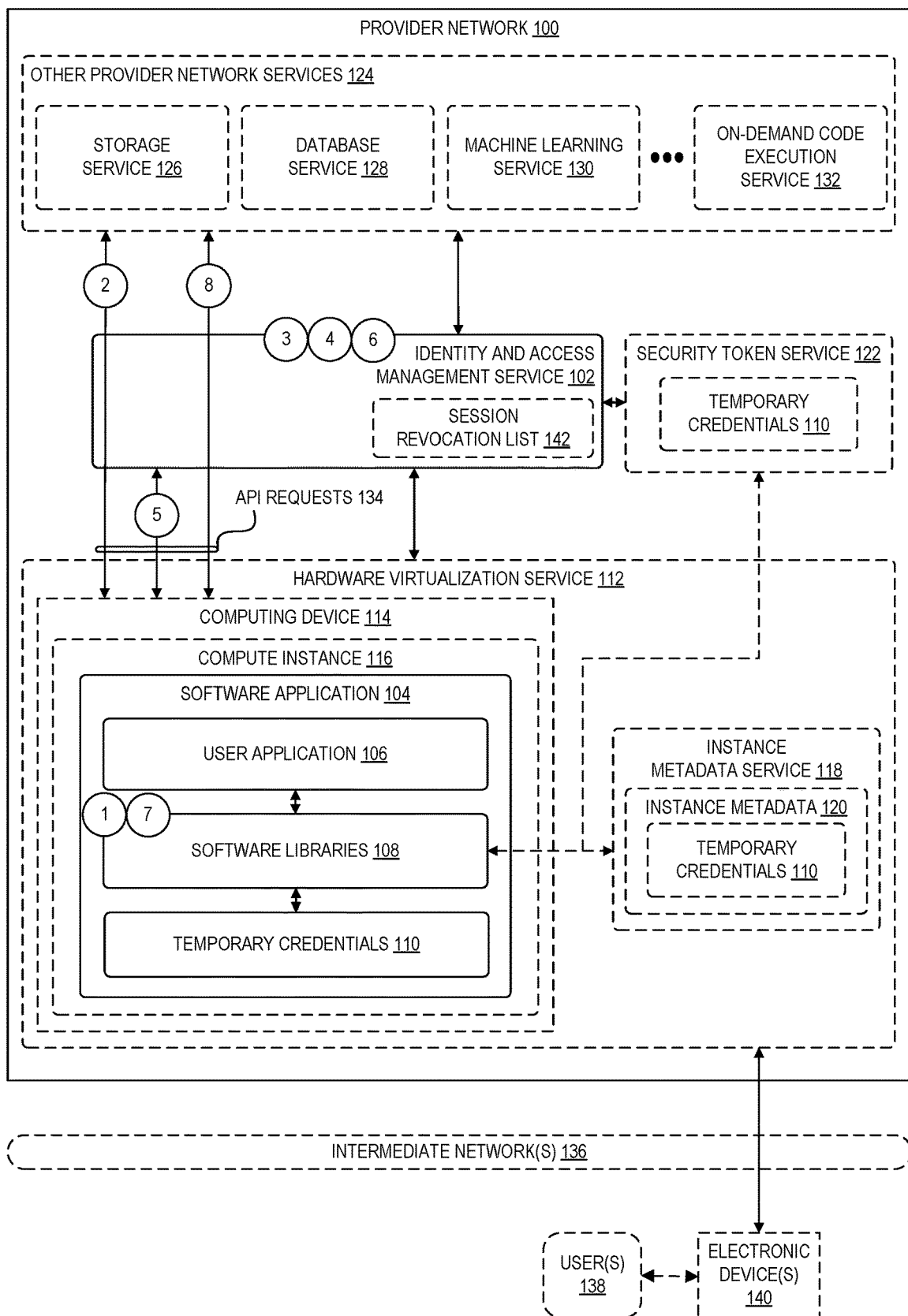
FIG. 1 is a diagram illustrating an environment in which a software application obtains security credentials used to interact with a cloud provider network and, upon the revocation of the active security credentials, obtains new security credentials that the application can use to continue operation according to some embodiments.

The present disclosure relates to methods, apparatus, systems, and non-transitory computer-readable storage media for enabling software applications to obtain security credentials used to interact with a cloud provider network and, upon the revocation of an active set of security credentials used by an application (e.g., due to concerns about the credential's potential exposure to one or more unauthorized third parties), to readily obtain new security credentials that the application can use to continue operation with minimal interruption. The security credentials can be used, for example, to enable the cloud provider network to authenticate and authorize requests sent by software applications or users to various services or other components of the cloud provider network. According to some embodiments, an operator of a cloud provider network provides a software development kit (SDK) or other software development resources that application developers can use to incorporate functionality into applications related to the management of security credentials. For example, in some embodiments, the software development resources include libraries that implement functionality for automatically obtaining security credentials for a user application, determining when active security credentials may have been revoked by a provider network, and automatically obtaining new security credentials for the user application, as needed. In this manner, potential security risks associated with the unintended exposure of security credentials to unauthorized parties can be efficiently mitigated with minimal impact to user applications that make use of such security credentials to interact with a cloud provider network.

In some embodiments, upon a cloud provider network detecting a potential security risk associated with an active set of security credentials, the cloud provider network causes execution of an authorized third-party computing resource to make a determination of whether the credentials are to be revoked or not. For example, the third-party computing resource may be a software application, code executed by an on-demand executable code service of the provider network, or any other executable logic that can make an automated determination of whether to vouch for the security of the credentials (in which case it may be requested that the credentials remain in use) or to repudiate the credentials (in which case it may be requested that the cloud provider network revoke the credentials). In some embodiments, logic implemented by a third-party credential vouching resource can be customized by a developer associated with a user application that makes use of security credentials provided by a provider network.

A cloud provider network enables users to use a variety of computing-related resources such as compute resources, storage resources, networking resources, and the like. User interactions with a cloud provider network (e.g., using an application programming interface (API), command line interface (CLI), or web-based console) typically involve the specification of security credentials (usernames and passwords, access keys, etc.) used by the cloud provider network to verify who the user or application is and whether the user or application has permission to access the requested resources. For example, in this context, access keys may refer to long-term security credentials that consist of two parts: an access key identifier and a secret access key. Similar to a username and password, access keys can be used by a user or application when sending requests to a cloud provider network so that the provide network can authenticate the user or application. In some cases, the use of access keys can be more secure than using usernames and passwords in part because the access keys are not human-generated, and a secret access key typically does not need to be sent directly as part of a request and can instead be used to digitally sign requests, thereby reducing the possibility of the credentials being exposed to unauthorized third parties.

Although the use of long-term access keys may improve security in some cases compared to the use of usernames and passwords, such access keys are nevertheless susceptible to security issues. As indicated above, users and software applications that interact with a cloud provider network typically are required provide appropriate security credentials in association with their API requests and other interactions. To enable a software application to generate such requests programmatically, a software developer might store a set of long-term access keys directly within their application, or within a compute instance upon which the application is executing, to allow the application to use those credentials. Developers are then required to manage the credentials directly to ensure that the long-term credentials remain secure, that the credentials are securely passed to an application or compute instances hosting an application upon launch, and that the application or instance is updated when credentials are rotated. Despite best efforts to safeguard such access keys, these processes may often cause access keys to be vulnerable to mishandling and inadvertent exposure to unauthorized third parties. Once in the possession of an unauthorized third party, access keys can be used to impersonate the actual owner of the credentials, enabling a malicious actor to perform undesirable actions and misuse computing resources associated with the authorized owner.

For the foregoing reasons and others, it is often considered best practice to use temporary security credentials rather than long-term access keys when possible. Temporary security credentials can be used in largely the same manner as long-term access keys credentials except that temporary security credentials are short term and can be configured to last anywhere from seconds, several hours, or any other defined period of time. Once a set of temporary security credentials issued by a cloud provider network expires, the cloud provider network no longer recognizes the credentials or allows any kind of access from API requests associated with the credentials. In some embodiments, temporary security credentials may not be permanently stored by an application or user and are instead provided by a cloud provider network upon request. When or before a set of temporary security credentials expires, a user or application can request new temporary credentials, if desired. Among other benefits, the limited lifespan of temporary security credentials alleviates users and applications from needing to rotate or explicitly revoke credentials when the credentials are no longer needed. Furthermore, after temporary security credentials expire, the credentials cannot be reused and therefore are less susceptible to long term misuse if inadvertently exposed.

In some embodiments, a set of temporary security credentials includes an access key identifier, a secret access key, and additionally a security token (sometimes also referred to as a session token). As indicated above, the access key identifier and secret access key associated with temporary security credentials operate similarly to the use of access key identifiers and secret access keys associated with long-term access key credentials. In some embodiments, a security token associated with a set of temporary security credentials encodes session information related to the associated temporary access keys, and the token is provided with requests sent by the user or application to which the temporary security credentials are issued. In some embodiments, the session information encoded by a security token can include, for example, any of an indication of when the session expires, an identity of the owner of the credentials, a set or permissions or security role associated with use of the credentials, and the like. In some embodiments, the security token is encrypted to provide secrecy between an application or user using the token and the cloud provider network, and is digitally signed so that the cloud provider network can verify the integrity of the token (e.g., by using a public/private key pair to verify that the token is not modified once issued by the provider network). In this manner, a security token provides for the establishment of a stateless security credential session between a user or application to which the credentials are issued and the cloud provider network.

While the use of temporary security credentials may even further improve the security of using access key-based authentication in some cases, temporary credentials are also nevertheless susceptible to mishandling and inadvertent exposure to unauthorized third parties. Although any given set of temporary security credentials automatically expires after a set period of time, if obtained by a malicious third party, the temporary credentials still can be misused for the remainder of a credential session. While such potential misuse of temporary credentials may be detected in some cases, remedying the situation presents a number of challenges. For example, due in part to the stateless nature of temporary credential sessions, it can be difficult to revoke particular sets of temporary security credentials in a manner that does not cause significant disruption to users and applications relying the temporary credentials. A provider network may, for example, enable users concerned about a set of temporary credentials to modify permissions associated with a security role with which the credentials are associated—however, such modifications can potentially disrupt the operation of any number of temporary security credentials associated with the same role and that may be unrelated to a given security issue affecting a particular set of credentials. Furthermore, the revocation of temporary security credentials may significantly disrupt the operation of software applications that rely on the credentials and that may not be able to handle situations where an active set of credentials are invalidated prior to their ordinary expiration time.

The aforementioned challenges, among others, are addressed by the described techniques for enabling software applications to obtain security credentials used to interact with a cloud provider network and, upon the revocation of active security credentials used by an application (e.g., due to concerns about the credential's potential exposure to one or more unauthorized third parties), to readily obtain new security credentials that the application can use to continue operation with minimal interruption. In some embodiments, the security credentials are temporary security credentials, as described above, but may also be long-term security credentials in other examples. As indicated above, in some embodiments, an operator of a cloud provider network may provide an SDK or other development resource that software developers can use to integrate functionality into their applications that is configured to recognize instances of an active set of security credentials being revoked and to automatically obtain new security credentials in such cases. According to some embodiments, software developers can also create and customize credential vouching functions that can be used to determine whether to revoke a particular set of security credentials on a case-by-case basis. These and other embodiments related to the handling of potential security issues involving security credentials used to interact with a cloud provider network are described in more detail herein.

FIG. 1 is a diagram illustrating an environment in which a software application obtains security credentials used to interact with a cloud provider network and, upon the revocation of the active security credentials, obtains new security credentials that the application can use to continue operation according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users (e.g., users 138) may interact with a provider network 100 across one or more intermediate networks 136 (e.g., the internet) via one or more interface(s), such as through use of application programming interface (API) calls, via a console implemented as a website or application, etc., accessed via one or more electronic device(s) 140. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As indicated above, it is often desirable for software applications and users that interact with a cloud provider network to use security credentials to authenticate interactions with the provider network 100. The numbered circles "1"-"8" in FIG. 1 illustrate a process involving a software application 104 obtaining security credentials 110 that can be used to authenticate requests sent by the application to various services and other components of a cloud provider network 100, the cloud provider network 100 determining that the security of a current set of security credentials 100 has been potentially compromised (e.g., based on a possible exposure of the credentials to an unauthorized third party), the cloud provider network 100 revoking the current security credentials 110 in response, the software application 104 detecting that the current security credentials 110 have been revoked, and the software application 104 automatically obtaining new security credentials 110 to replace the revoked security credentials, where the new security credentials can be used to continue operation.

In some embodiments, a cloud provider network 100 includes an identity and access management service 102 through which an entity such as a user 138 or software application 104 can issue actions or operations. The identity and access management service 102 can be one or more software applications or programs executed by the processors of one or more computer systems of the provider network 100. The identity and access management service 102 generally provides identity and access management for the provider network 100 by authenticating users and managing sessions with services and resources of the provider network 100. For example, a user can authenticate with the provider network 100 through the identity and access management service 102 via an interface such as a CLI, a console implemented as a website or application, an API, etc. Using the identity and access management service 102, users can create and manage users and groups, and configure permissions to allow and deny users access to cloud provider network resources.

In some embodiments, users run software applications (e.g., a software application 104) on compute instances (e.g., a compute instance 116 executing on a computing device 114) provided by a hardware virtualization service 112 of the cloud provider network 100 and the operation of the software applications involves accessing other cloud provider resources (e.g., provided by other provider network services 124 including any of a storage service 126, a database service 128, a machine learning service 130, an on-demand code execution service 132, etc.). In other embodiments, a software application 104 executes using resources provided by another service such as a container service (not shown) or executes using resources outside of the provider network 100 (within an on-premises environment or in a different provider network). In some embodiments, a software application 104 executes on a compute instance 116 (e.g., a VM instance) provided by a hardware virtualization service 112 of the cloud provider network 100. Although FIG. 1 illustrates an example of a software application 104 executing on a compute instance, in other embodiments, a software application 104 executes as a container using a container service of the cloud provider network 100, as code executed by an on-demand code execution service 132, or more generally the software application 104 can be any type of executable computing resource executed on hardware provided by the provider network 100 or hardware provided by an entity separate from the provider network 100.

As indicated above, the software application 104 uses security credentials to authenticate requests sent to the cloud provider network 100. In the example of a hardware virtualization service 112 in FIG. 1, the compute instances hosting the software applications can be provided with temporary security credentials 110 that are available to applications running on the instance. In addition to compute instances provided by a hardware virtualization service 112, temporary security credentials can be provided to and used by computing resources associated with other types of cloud provider services including, but not limited to, batch computing services, container services, machine learning services, on-demand code execution services, object storage services, database services, management and governance services, security services, mobile services, networking and content delivery services, media services, analytics services, application integration services, satellite services, Internet of Things (IoT) services, blockchain services, and the like. In other embodiments, a software application 104 obtains security credentials using identity federation. For example, the software application 104 may use an X.509 certificate or other authentication mechanism to authenticate to an identity provider (IDP) system associated with an entity that is separate from the cloud provider network 100, wherein the IDP is then able to obtain security credentials from the cloud provider network 100 on behalf of the software application 104 and to provide the credentials to the application upon request. Thus, the software application 104 may generally be provided with credentials as needed, whether from an instance metadata service 118, a security token service 122, or from the cloud provider network 100 via a separate IDP system using identity federation.

The software application 104 generally represents any software application that interacts with one or more services or components of the cloud provider network 100 during operation. The software application 104, for example, can be web application, standalone application, or any other type of application implementing virtually any type of application functionality. For example, the software application 104 may implement a web application that further interacts with one or more database services, storage services, networking services, etc., of the provider network 100 during operation. Although depicted as a single application entity, the software application 104 may be implemented as a distributed or microservice-based software application that includes multiple interworking software components. The software application 104 may be developed and maintained by any user of the provider network 100, by an operator of the cloud provider network 100, or generally by any other entity.

In some embodiments, the software application 104 includes first functionality implemented by a user application 106, where the first functionality represents any type of user application that involves interaction with one or more services or other components of the cloud provider network 100, as described above. The software application 104 further includes second functionality implemented by software libraries 108, where such libraries may be included as part of a software development kit (SDK) or other software development resources provided by an operator of the cloud provider network. For example, an operator of a cloud provider network 100 may provide any number of SDKs for various different programming languages and development environments, where such SDKs generally enable users to more easily develop applications that interact with and use resources and services of the cloud provider network 100. A cloud provider network SDK may include, for example, APIs, code samples, documentation, and other resources that enable user applications to perform such interactions. In the context of software application 104, the software libraries 108 include functionality that manages processes related to obtaining security credentials (e.g., including temporary security credentials) on behalf of a user application 106 (e.g., from an instance metadata service 118, security token service 122, IDP, or other source) and providing the credentials to the user application 106 for use, as described in more detail herein.

The hardware virtualization service 112 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, at circle "1" in FIG. 1, a software application 104 obtains a set of security credentials 110 to be used by the software application to authenticate requests sent to various services (e.g., the hardware virtualization service 112, other provider network services 124, etc.) or other components of the cloud provider network 100 during execution of the application. In some embodiments, the functionality implemented by the software libraries 108 of software application 104 obtains the security credentials 110 responsive to a request from the functionality implementing the user application 106 to use the credentials (e.g., based on function call or API request in the user application 106). For example, the functionality implementing user application 106 may request that security credentials 110 be obtained prior to the application generating requests to other services of the provider network 100 or as part of an API request to a service of the provider network 100. In other embodiments, the software application 104 may be configured to obtain the security credentials 110 automatically and without an explicit request from the user application 106.

Figure 2:
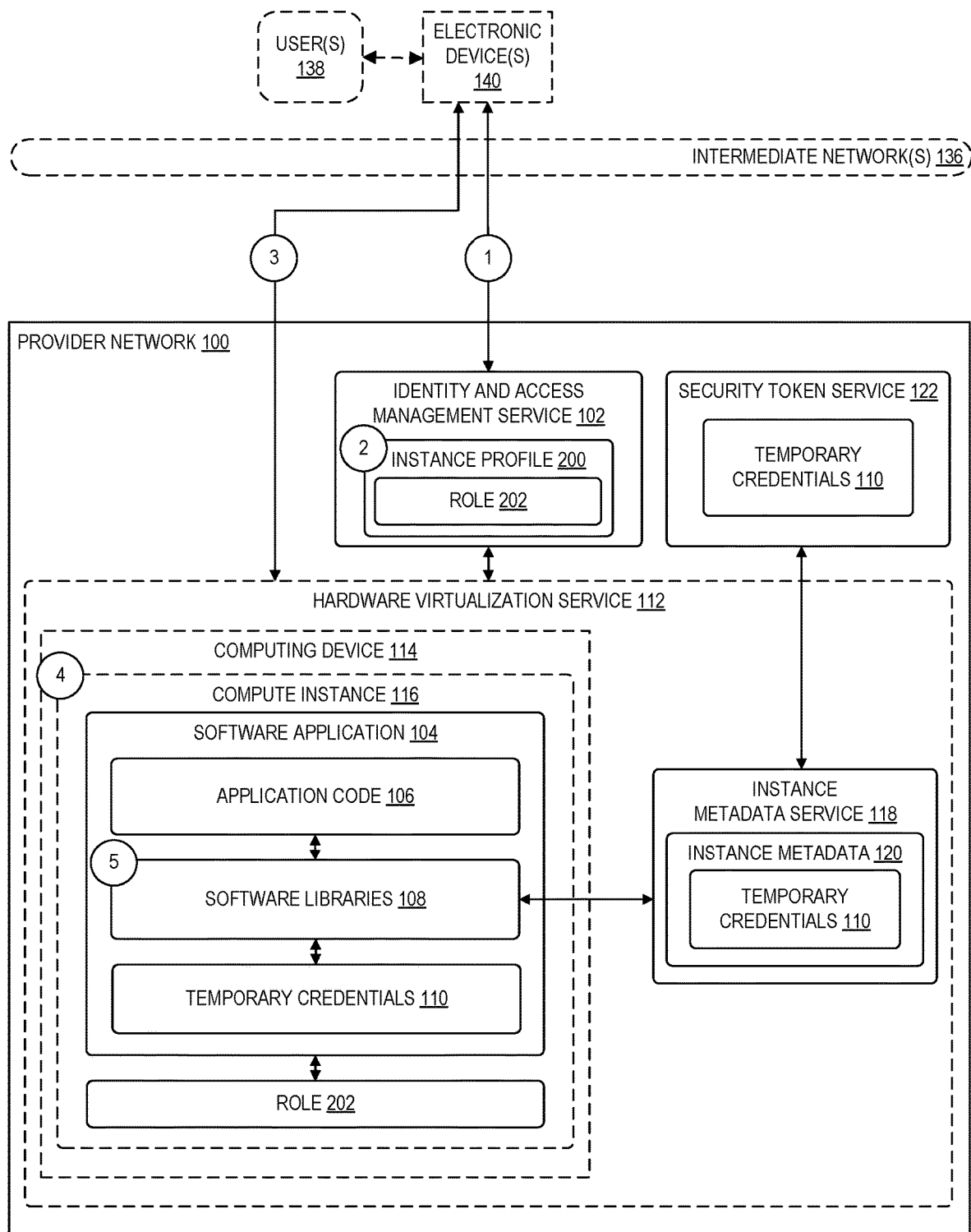
FIG. 2 is a diagram illustrating an environment in which a software application running on a compute instance provided by a hardware virtualization service obtains security credentials from an instance metadata service according to some embodiments.

In some embodiments, the hardware virtualization service 112 provides an instance metadata service 118 from which a computing device 114 upon which the compute instance 116 is executing can obtain temporary security credentials 110, and where the software application 104 can then use the obtained temporary security credentials 110 (e.g., based on the security credentials storage in locally accessible instance metadata containing the credentials). FIG. 2 illustrates additional details of an example environment in which a software application 104 obtains temporary security credentials 110 via an instance metadata service 118 of a hardware virtualization service 112. Although FIG. 2 illustrates an example of an instance metadata service 118 provided by a hardware virtualization service 112, similar techniques can be used by other types of services that provide computing resources such as a container service, on-demand code execution service 132, and the like.

In some embodiments, the numbered circles "1"-"5" in FIG. 2 illustrate a process in which a compute instance 116 automatically obtains temporary security credentials 110 from an instance metadata service 118 based on the attachment of a "role" to the compute instance 116, where the obtained temporary security credentials 110 can then be used by a software application 104 executing on the compute instance 116. A compute instance 116 can obtain temporary security credentials based on the attachment of a role at the time the instance is launched or once the instance is running. The role thus enables user applications running on the instance to obtain temporary security credentials from instance metadata at the computing device 114 that can then be used to sign API requests.

In some embodiments, at circle "1" in FIG. 2, a user requests the creation of a role, and optionally an instance profile, and at circle "2," the identity and access management service 102 stores data representing the created role, instance profile, or both. In some embodiments, a "role" is an identity that a user can create using an identity and access management service 102 in association with a user account, where the role is associated with a specified set of permissions. Whereas an account is typically associated with one person, a role may be assumable by anyone or any application with permissions to do so. In some embodiments, a role may not be associated with standard long-term credentials, such as a password or access keys, but rather a user or application assuming a role is provided with temporary security credentials for the role session, as described herein.

As indicated, in some embodiments, an identity and access management service 102 of a cloud provider network 100 enables users to create security "roles" that can be attached to compute instances, where such security roles enable applications running on the instances to obtain temporary security credentials. As further indicated above, these temporary security credentials can be used to make API requests and to perform other actions in a manner similar to the use of long-term credentials. Thus, when using a role, long-term credentials (such as a username and password or access keys) need not be distributed to a compute instance or software application running on the compute instance. Instead, the attached role supplies temporary permissions that applications can use when making calls to other cloud provider services and resources.

In some embodiments, using roles to grant permissions to applications that run on a compute instance further involves the creation of an instance profile 200. For example, because a software application running on an compute instance is abstracted from the cloud provider network 100 by a virtualized operating system, an instance profile may be used to assign a role 202 and its associated permissions to a compute instance (e.g., compute instance 116) and to make the permissions available to the instance's software applications (e.g., software application 104). In some embodiments, an instance profile 200 contains a role 202 and can provide the role's temporary security credentials to applications that runs on an instance to which the profile is attached. Those temporary security credentials can then be used, for example, in the application's API calls to access resources and to limit access to only those resources that policies associated with the role 202 permits. In some embodiments, only one role 202 can be assigned to compute instance at a time and all applications on the instance share the same role and permissions; in other embodiments, multiple roles can be assigned to an instance and used independently by various applications on the instance as appropriate.

As an example, consider a developer creating a software application 104 to be executed on a compute instance 116 and that involves access to a particular storage resource provided by an object storage service of the cloud provider network 100. In this example, a user may create a role 202 associated with permissions that enable read-only access to the storage resource and attach the role to the instance 116 (e.g., by launching the instance 116 with an identification of an instance profile 200 that contains the role 202). The role 202 also includes a trust policy that allows a compute instance 116 to assume the defined role 202 and to retrieve temporary security credentials 110 associated with the role 202. When an application 104 then runs on the instance 116, the application 104 can use the role's temporary security credentials 110 to access the specified storage resource. In this manner, an administrator need not grant a developer of the application permission to access the storage resource, and the developer need not share or manage credentials for the application 104.

Returning to FIG. 2, in some embodiments, at circle "3," the hardware virtualization service 112 receives a request to launch an instance (e.g., compute instance 116), wherein the request identifies a role 202 to be attached to the instance. As indicated above, in some embodiments, a role is identified based on a specified instance profile 200 that contains the role 202. In some embodiments, at circle "4," the hardware virtualization service 112 obtains the identified role 202 or instance profile 200 from the identity and access management service 102, attaches the role 202 to the launched instance 116, and causes temporary security credentials 110 to be injected into instance metadata 120 for the instance as managed by an instance metadata service 118. In some embodiments, the temporary security credentials 110 are obtained from a security token service 122 based on the instance profile 200 or role 202 information. In some embodiments, the security token service 122 is a web service that enables users and applications to request temporary security credentials for users and roles associated with the identity and access management service 102.

In some embodiments, at circle "5" in FIG. 2, the software application 104 executes on the compute instance 116 and the software libraries 108 obtain the temporary security credentials 110 from the instance metadata service 118 upon request from functionality in the application code 106. In some embodiments, a software application 104 running on an instance 116 retrieves the temporary security credentials 110 provided by the role by accessing a specific instance metadata item (e.g., "iam/security-credentials/role-name"), which may be associated with a specific URL and locally accessible at the compute instance 116. Based on the obtained temporary security credentials 110, the application 104 is granted the permissions for the actions and resources that have been defined by the role 202 through the temporary security credentials 110 associated with the role. As indicated above, these temporary security credentials 110 expire after a defined period of time and are rotated automatically. In some embodiments, application code 106 making use of the temporary security credentials 110 need not explicitly obtain the temporary security credentials 110—instead, the application code 106 may rely on the second functionality implemented by the software libraries 108 (e.g., provided by SDKs) to automatically obtain the credentials from the instance metadata service 118 and use them when generating requests.

Returning to FIG. 1, in some embodiments, at circle "2," the software application 104 uses the obtained security credentials 110 to send one or more API requests 134 to one or more other services or components of the cloud provider network 100 (e.g., other provider network services 124). In some embodiments, code associated with user application 106 sends the API requests 134, for example, as part of the application's functionality, although one or more of the requests 134 may also be sent by functionality implemented by the software libraries 108.

In some embodiments, the software application 104 authenticates itself with each API request 134 (e.g., the application 104 includes information used to prove the identity of the application to the provider network 100). The identity of the requestor, for example, is used by the identity and access management service 102 to determine whether to allow or deny any particular request. In some embodiments, the generation of API requests 134 involves the user application 106 or software libraries 108 using a custom HTTP scheme based on a keyed-HMAC (Hash Message Authentication Code) for authentication. For example, to authenticate an API request 134, selected elements of the request may be concatenated to form a string. In some embodiments, the secret access key of the temporary security credentials 110 is then used to calculate the HMAC of that string (informally, referred to as "signing the request" and the output of the HMAC algorithm may be referred to as the "signature.") The signature may then be added as a parameter of the request by using a defined syntax.

As indicated elsewhere herein, an active set of security credentials 110 (that is, credentials that have not yet expired) may be compromised at some point during the credential's lifespan. For example, the credentials may be inadvertently exposed, stolen, or otherwise obtained by an unauthorized third party. In some embodiments, at circle "3," the identity and access management service 102 detects that active security credentials session has potentially been compromised or is otherwise associated with anomalous activity.

Figure 3:
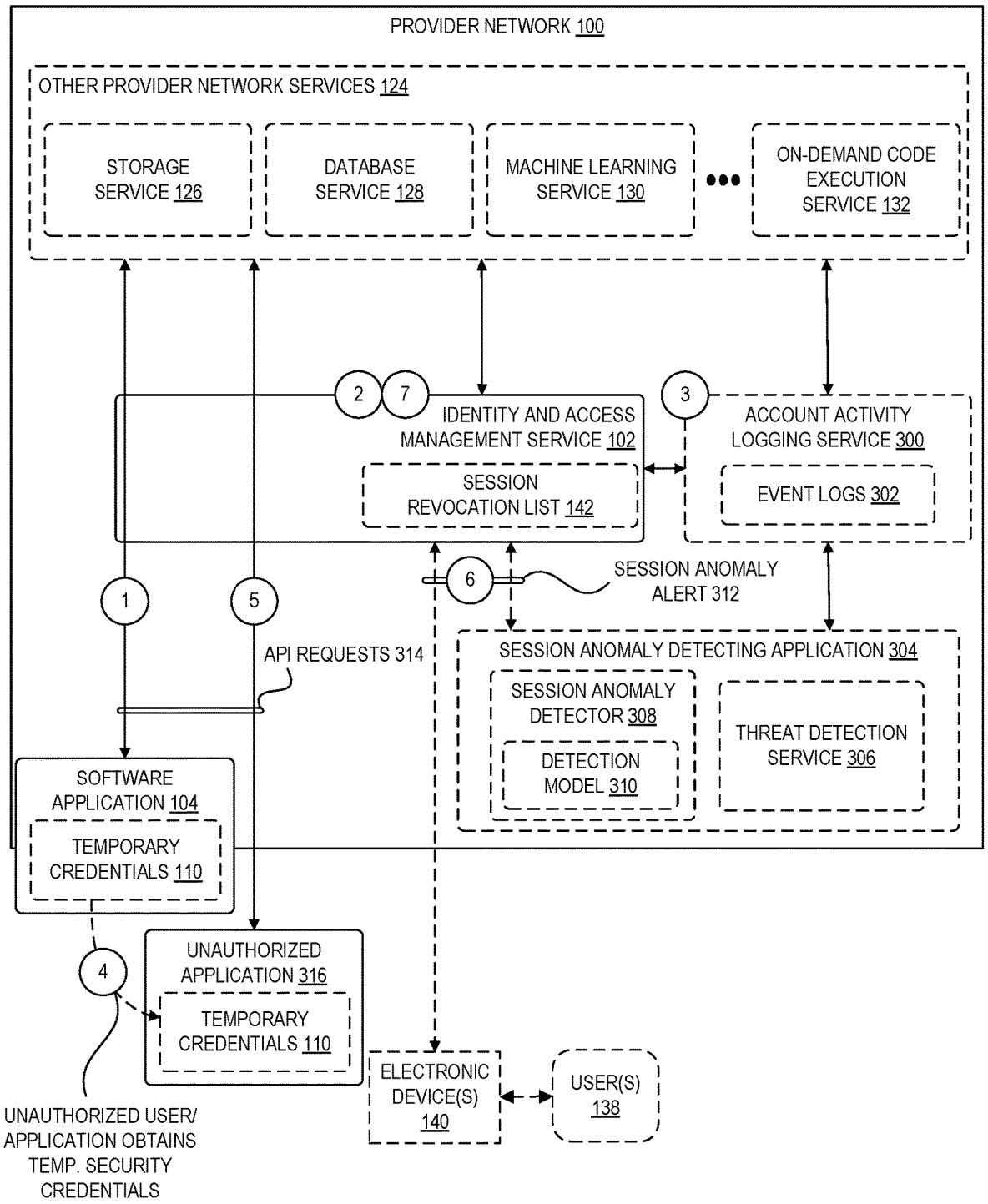
FIG. 3 is a diagram illustrating an environment in which an identity and access management service is notified that the security an active set of security credentials has been potentially compromised according to some embodiments.

FIG. 3 illustrates an environment in which an identity and access management service is notified that the security an active set of security credentials has been potentially compromised. In some embodiments, at circle "1" in FIG. 3, the software application 104 uses an active set of security credentials 110 to generate one or more requests sent to one or more services 124 or other components of the provider network 100 and, at circle "2," the identity and access management service 102 authenticates and authorizes the requests based on the security credentials 110 used to generate the requests.

In some embodiments, information about the API requests 314 is stored in event logs 302 of an account activity logging service 300. For example, for reasons discussed herein and others, the logging and monitoring of API calls are often components of security best practices, as well as requirements for industry and regulatory compliance in some cases. In some embodiments, an account activity logging service 300 is a web service that records API calls to services of the provider network 100 as event logs 302 accessible to associated user account(s). In other embodiments, log information about API requests 314 is generated and stored by the identity and access management service 102, another service of the provider network 100, by the application 104, or by any other component internal or external to the provider network 100.

In some embodiments, at circle "4," the security credentials 110 are exposed to an unauthorized third party associated with an unauthorized application 316. As indicated above, once in the hands of an authorized third party, the third party can perform any action in the associated user account permitted by the policies associated with those credentials (e.g., possibly including launching new compute instances, storing objects, deleting instances or stored objects, etc.). For example, a set of access keys may be accidentally committed to a public software development version control service, stolen from a compromised developer machine, intercepted when sent over an insecure network connection, or by other means.

In some embodiments, at circle "5," the unauthorized application 316 sends one or more API requests 314 using the security credentials 110. As discussed above, the identity and access management service 102 may authenticate and authorize the requests sent by the unauthorized application 316 due to their use of the active security credentials 110 and, thus, undesirable actions associated with a user account may be performed by the unauthorized application 316.

In some embodiments, at circle "6," an entity determines that anomalous activity is occurring with respect to the security credentials 110 session and sends a session anomaly alert 312 to the identity and access management service 102. The entity detecting the anomalous activity can include, for example, any type of session anomaly detecting application 304, a user 138 of the provider network 100, or generally any entity with access to event logs 302 or other information that may be used to identify possible cases of misuse. For example, a session anomaly detecting application 304 may analyze event logs 302 for request patterns that are indicative of possible misuse (e.g., sudden spikes in resource usage, uses of instance images or other resources known to be associated with misuse, etc.). In some embodiments, a threat detection service 306 may be configured to continuously monitor event logs 302 or other data for malicious activity, or a session anomaly detector 308 application may use machine learning techniques based on one or more detection models 310 to monitor for anomalous behavior. In other examples, a user 138 may notice unusual activity associated with the user's account by analyzing logs or seeing unusual activity in their account via a console or other interface. In some embodiments, any of such entities may generate and send a session anomaly alert 312 to the identity and access management service 102 via an API request, web-based console, CLI, or other interface, where the alert identifies the security credentials for which a security concern exists.

In some embodiments, at circle "7" in FIG. 3, responsive to the session anomaly alert 312, the identity and access management service 102 revokes or otherwise invalidates the identified temporary security credentials 110, as described further hereinafter. For example, returning to FIG. 1, at circle "4," the identity and access management service 102 revokes a set of security credentials 110 for which a security concern exists, where such concern may be identified as described above in reference to FIG. 3. In some embodiments, an identity and access management service 102 may periodically revoke security credentials at random or otherwise capriciously, e.g., to help ensure that applications are prepared to handle such revocations.

In some embodiments, due in part to the stateless nature of temporary security credentials 110, an identity and access management service 102 creates and manages a session revocation list 142 to store an indication of temporary security credentials sessions that have been revoked. For example, the session revocation list 142 may comprise a database table or other data structure that stores identifiers of temporary security credentials (e.g., based on associated access key identifiers) that have been revoked based on security concerns. In some embodiments, the identity and access management service 102 uses the session revocation list 142 to deny API requests 134 received that are associated with credentials stored in the session revocation list 142. In some embodiments, identifiers of temporary security credentials stored in the session revocation list 142 may be removed at the point in time at which the credentials are to expire since the credentials are invalid at that point in any event. In other embodiments, a set of temporary security credentials 110 may be revoked or invalidated using other mechanisms, e.g., such as the automatic modification of permissions specifically for the credentials to deny any actions requested using the credentials, or the like.

In some embodiments, after the identity and access management service 102 revokes the security credentials, at circle "5" in FIG. 1, the software application 104 sends one or more API requests using the revoked security credentials. In this example, the software application 104 may be unaware that the security credentials 110 have been revoked and the request sent may be for an action that is otherwise within the permissions associated with the credentials. Thus, the software application 104 may expect for the request to be authenticated and authorized by the identity and access management service 102 as usual.

In some embodiments, at circle "6" in FIG. 1, the identity and access management service 102 determines that the security credentials 110 used to generate the request(s) sent at circle "5" have been revoked and thus denies the request(s). In some embodiments, the identity and access management service 102 determines that the security credentials have been revoked by locating an identifier of the security credentials in a session revocation list 142, as described above. In other embodiments, the identity and access management service 102 uses one or more other mechanisms to determine that the security credentials are currently revoked. In some embodiments, the identity and access management service 102, responsive to determining that the security credentials 110 used to generate the requests have been revoked, sends a response message to the software application 104. The response message, for example, may include data indicating some or all of: that the request is being denied by the identity and access management service 102, that the identity and access management service 102 has identified a potential security issue associated with the security credentials used to generate the request, that the identity and access management service 102 has revoked the security credentials, or other types of information or combinations thereof.

In some embodiments, at circle "7" in FIG. 1, the software application 104 determines that API requests using the revoked security credentials are no longer accepted by the cloud provider network 100 and, responsive to the determination, obtains new security credentials to replace the invalid security credentials. For example, functionality implemented by the software libraries 108 may examine a response sent from the identity and access management service 102 indicating that the requests are being denied, that the current temporary security credentials used by the application are no longer valid, or including other information indicative of the credentials' revocation. In some embodiments, the software libraries 108 include functionality to automatically obtain new security credentials from the instance metadata service 118, the security token service 122 (possibly via a separate IDP system, as described above), or from any other source. For example, the identity and access management service 102, responsive to the determination to revoke the credentials, may cause new security credentials to be stored at the instance metadata service 118 for the instance 116.

In some embodiments, at circle "8," the software application 104 sends additional API requests 134 using the newly obtained security credentials. The identity and access management service 102 successfully authenticates the request(s) and, assuming the action requested by the API requests at circle "8" are within the permissions associated with the credentials, authorizes the requests to be performed by an appropriate service of the cloud provider network 100. The software application 104 is thus able to continue operation (e.g., involving interaction with various services and resources of the cloud provider network 100) with the new security credentials, and may continue using the new security credentials until those credentials are expired or are revoked.

The example described in FIG. 1 illustrates a process in which a cloud provider network 100 detects a potential security issue involving a set of security credentials, revokes the security credentials, and provides new security credentials to replace the revoked security credentials. In some embodiments, instead of revoking security credentials responsive to a determination that security of the security credentials has been potentially compromised, an identity and access management service 102 modifies session permissions associated with the security credentials or modifies an expiration schedule associated with a set of temporary security credentials. For example, responsive to receiving a notification about a particular set of security credentials, an identity and access management service 102 may modify permissions associated with a role from which the credentials are derived to limit the types of actions that the credentials can perform (e.g., to change permissions associated with stored data objects from write permissions to read-only permissions, to limit types of computing resources that the credentials can create, or any other similar restrictions). As another example, the identity and access management service 102 may reduce an expiration schedule associated with a set of temporary security credentials (e.g., if temporary security credentials are set to expire in several hours, the identity and access management service 102 may instead store data indicating that the credentials are to expire in several minutes instead).

Figure 4:
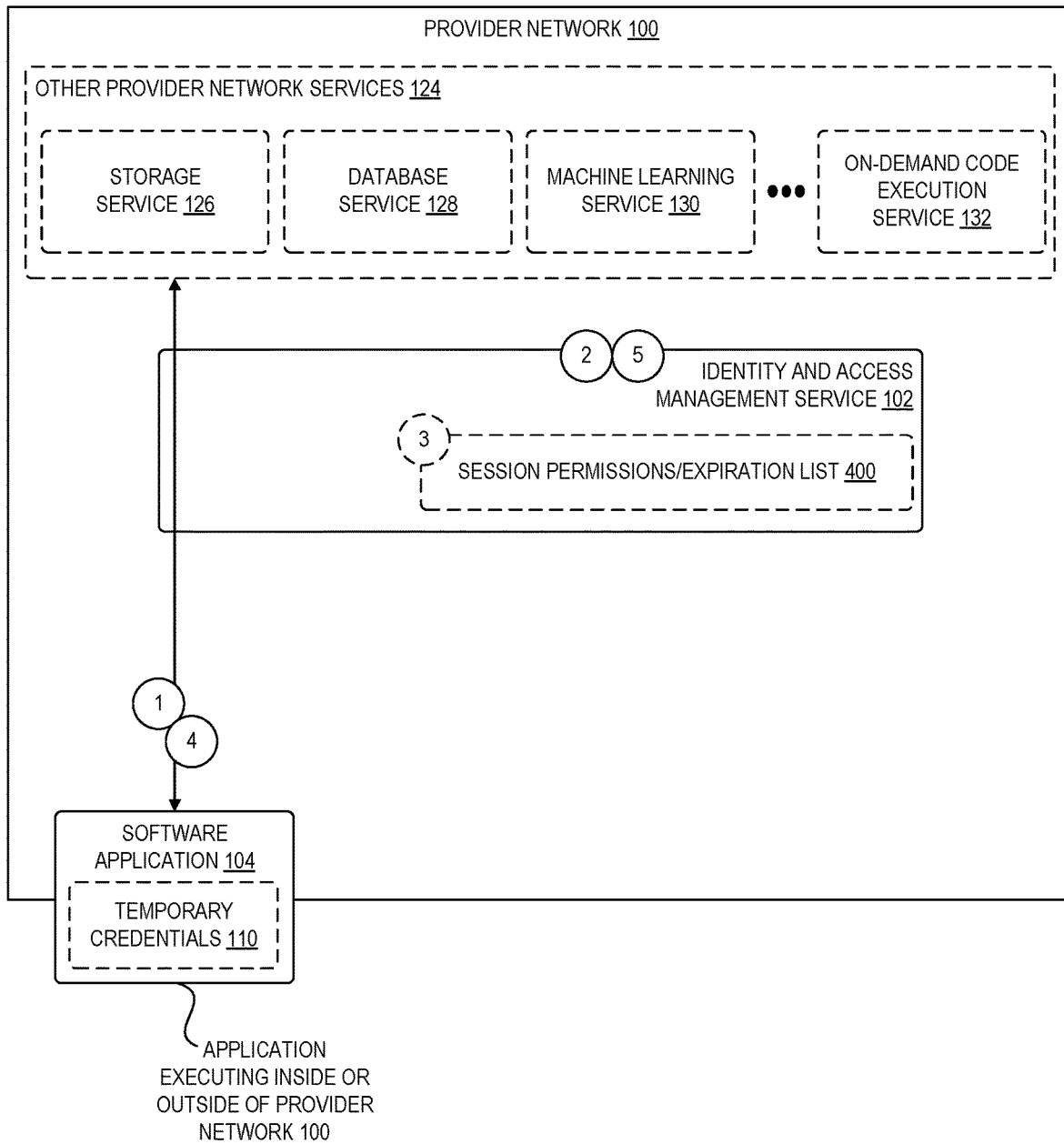
FIG. 4 is a diagram illustrating an environment in which an identity and access management service modifies permissions or an expiration schedule associated with an active set of security credentials responsive to detection of a security concern associated with the security credentials according to some embodiments.

FIG. 4 is a diagram illustrating an environment in which an identity and access management service modifies permissions or an expiration schedule associated with an active set of security credentials responsive to detection of a security concern associated with the security credentials. In some embodiments, at circle "1" in FIG. 4, the software application 104 sends one or more requests using security credentials, as described above.

In some embodiments, at circle "2" in FIG. 4, the identity and access management service 102 detects a potential security issues involving the security credentials. In some embodiments, at circle "3," the identity and access management service 102 modifies session permissions or an expiration schedule associated with the security credentials. For example, the identity and access management service 102 may modify permissions associated with a role from which the credentials are derived, where the changes may be stored as part of the role itself or as part of session permissions/expiration list 400 data maintained by the identity and access management service 102. In some embodiments, the types of permissions restricted by the identity and access management service 102 depend on the type of potentially malicious behavior detected. For example, if it is detected that an unusual number of compute instances are being launched using the credentials, permissions associated with launching instances may be modified; if it is detected that the credentials are being used to delete data in an unusual way, permissions associated with deleting data objects may be modified, and so forth. In some embodiments, an expiration schedule associated with the temporary security credentials can be similarly modified to reduce the lifespan of the credentials, possibly based on the severity of the detected behavior, where a shorter expiration time may be stored as part of role policy information or as part of separate session permissions/expiration list 400 data. For example, when API requests are received by the identity and access management service 102, the service may consult the session permissions/expiration list 400 to determine whether the credentials are in the list and whether any permissions or expiration schedule changes have been initiated for the credential session and process the request accordingly. For example, at circle "4" in FIG. 4, the software application 104 sends one or more additional requests after associated permissions or an expiration schedule has been modified and, at circle "5," the identity and access management service 102 processes the request(s) accordingly.

As illustrated in examples described herein, the revocation of security credentials can often be readily handled by a software application 104 by enabling such applications to automatically obtain new security credentials upon revocation. The revocation of security credentials in some scenarios however may cause a more significant disruption to the software application. For example, the nature of a software application 104 may not allow it to easily obtain new security credentials outside of the credentials' normal expiration schedule, or an application may not implement such functionality at all. In some embodiments, an identity and access management service 102 uses a credential vouching function to determine whether or not to revoke a particular set of security credentials. The credential vouching function may, for example, be implemented at least in part by a developer associated with the software application 104 and include logic that the developer believes helps to determine whether or not a particular set of credentials should be revoked (e.g., based on whether activity associated with a given set of security credentials is behavior expected by the developer). The identity and access management service 102 can then, upon receiving a notification of a potential security issue associated with a set of security credentials, propose the revocation of the credentials to a separate credential vouching function to make a revocation determination, thereby enabling developers to have more control over when security credentials used by the developer's applications are revoked.

Figure 5:
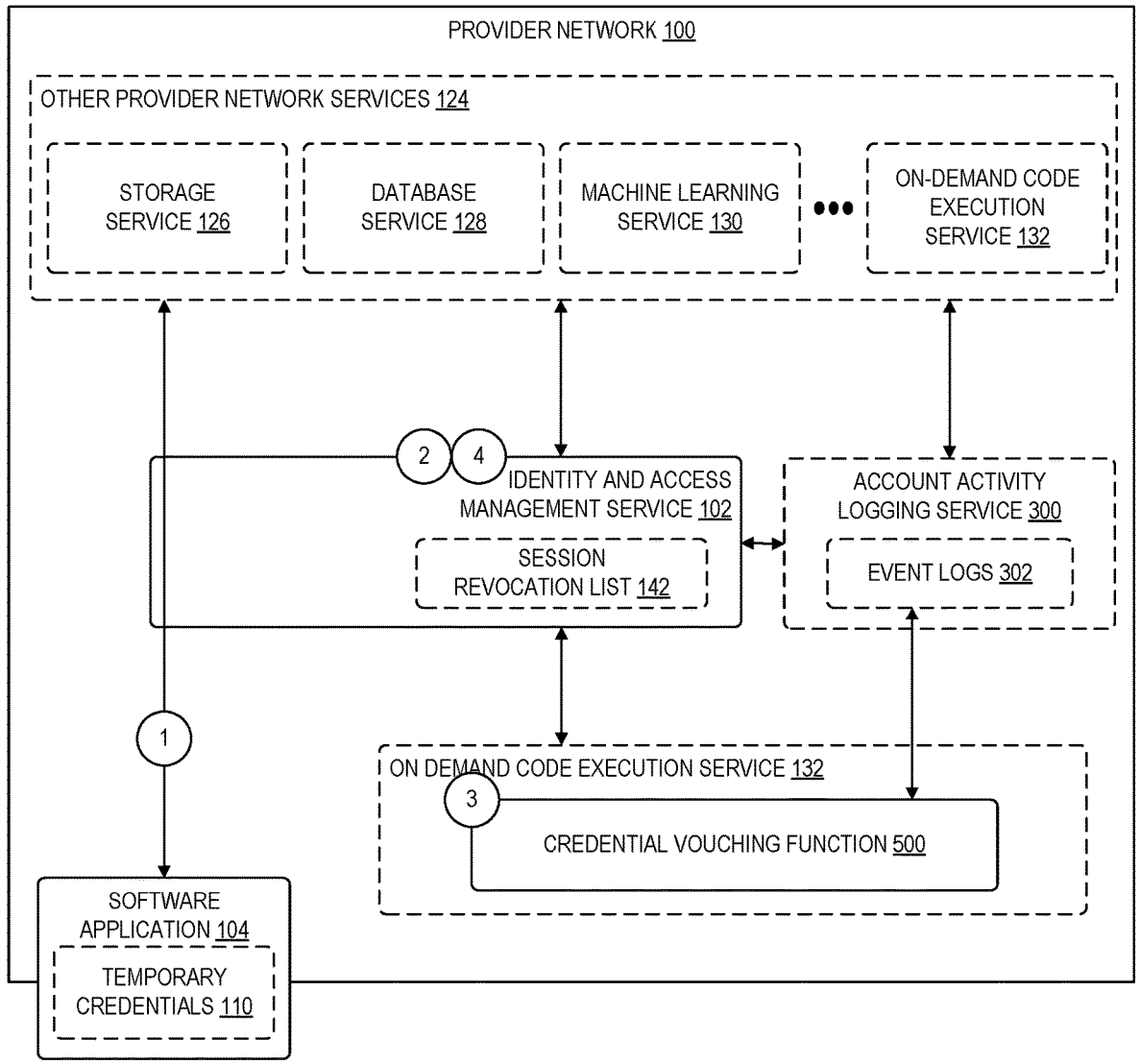
FIG. 5 is a diagram illustrating the use of an authorized credential vouching function to assist in a determination of whether to revoke active security credentials according to some embodiments.

FIG. 5 is a diagram illustrating the use of an authorized credential vouching function to assist in a determination of whether to revoke a set of active security credentials according to some embodiments. In some embodiments, at circle "1" in FIG. 5, the software application 104 uses security credentials 110 to send one or more API requests to services of the provider network 100 and, at circle "2," the identity and access management service 102 detects a potential security issue involving the credentials, as described above.

In some embodiments, at circle "3" in FIG. 5, responsive to the indication of the potential security issue involving the credentials, the identity and access management service 102 uses a credential vouching function 500 to determine whether to revoke the credentials. For example, a developer associated with the software application 104 may register the credential vouching function 500 with the identity and access management service 102 so that the service can invoke the function 500 as needed (e.g., by identifying an accessible endpoint associated with the function 500, an identifier of a notification queue that the function 500 listens to, etc.). As illustrated, in some embodiments, the credential vouching function 500 may be implemented as an on-demand executable function managed by an on-demand code execution service 132. In general, the credential vouching function 500 can be any type of executable computing resource (e.g., a standalone application, web service, on-demand executable function, etc.).

In some embodiments, the credential vouching function 500 is associated with its own set of credentials that enable the identity and access management service 102 to trust the function 500. In some embodiments, the functionality implemented by the credential vouching function 500 can include any logic that a developer believes aids in a determination of whether to revoke a particular set of security credentials— for example, the function may receive an identifier of the credentials at issue, consult event logs 302 or other data related to the credentials and credential activity, use one or more models to detect anomalous behavior, detect recent code deployments, analyze user logins, etc. In response to the proposal from the identity and access management service 102 to revoke the credentials, the function 500 may return a response indicating whether it vouches for the credentials and desires for the credentials to remain active or indicating that the function repudiates the credentials and desires for the credentials to be revoked. In some embodiments, if the function 500 returns a response indicating that the function 500 vouches for the credentials, the identity and access management service 102 modifies its own models for detecting anomalous behavior associated with the account to reduce a likelihood that future similar activity associated with the credentials is again flagged as being a potential security issue.

Although many of the examples described herein relate to the use of temporary security credentials by a software application, similar techniques can be used in cases where temporary security credentials involving identity federation.

Figure 6:
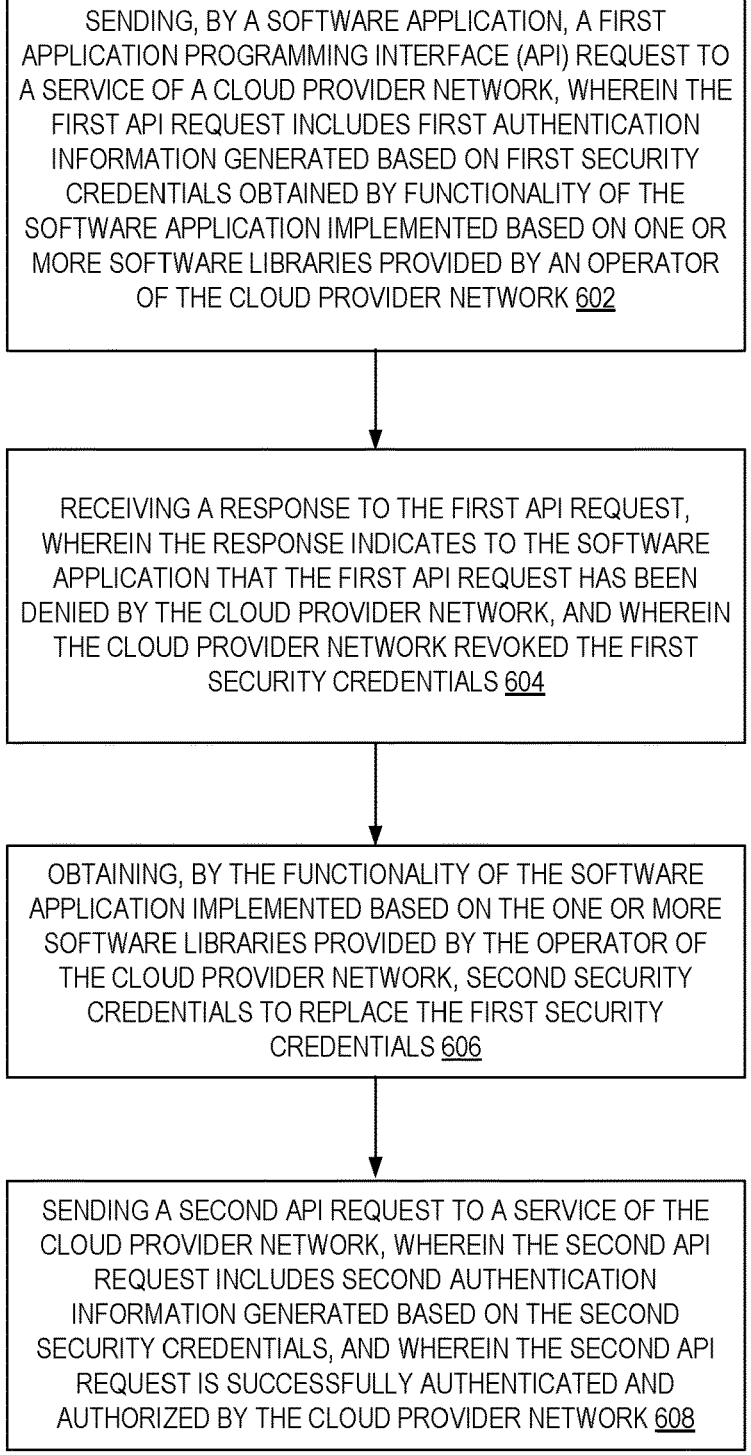
FIG. 6 is a flow diagram illustrating operations of a method enabling software applications to obtain security credentials used to interact with a cloud provider network and, upon the revocation of active security credentials used by an application, to readily obtain new security credentials that the application can use to continue operation with minimal interruption according to some embodiments.

FIG. 6 is a flow diagram illustrating operations 600 of a method for enabling software applications to obtain security credentials used to interact with a cloud provider network and, upon the revocation of active security credentials used by an application, to readily obtain new security credentials that the application can use to continue operation with minimal interruption according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a software application 104 of the other figures.

The operations 600 include, at block 602, sending, by a software application, a first application programming interface (API) request to a service of a cloud provider network, wherein the first API request includes first authentication information generated based on first security credentials obtained by functionality of the software application implemented based on one or more software libraries provided by an operator of the cloud provider network.

The operations 600 further include, at block 604, receiving a response to the first API request, wherein the response indicates to the software application that the first API request has been denied by the cloud provider network, and wherein the cloud provider network revoked the first security credentials.

In some embodiments, the cloud provider network causes execution of an executable computing resource that is separate from the software application and that is used to make a determination of whether to revoke the first security credentials, and wherein the cloud provider network revoked the first security credentials based on a response received from the executable computing resource.

In some embodiments, the cloud provider network revoked the first security credentials responsive to identification of anomalous activity associated with the first security credentials, and wherein the anomalous activity is detected by at least one of: a user of the cloud provider network, a session anomaly detecting application, or a threat detection service of the cloud provider network.

In some embodiments, the cloud provider network revokes the first security credentials by adding an identifier of the first security credentials to a session revocation list, wherein the session revocation list stores one or more identifiers of security credentials revoked by the cloud provider responsive to determinations that security of the one or more security credentials has been potentially compromised.

The operations 600 further include, at block 606, obtaining, by the functionality of the software application implemented based on the one or more software libraries provided by the operator of the cloud provider network, second security credentials to replace the first security credentials. In some embodiments, the first security credentials and the second security credentials are temporary security credentials, and wherein the temporary security credentials include a security token storing session information associated with the temporary security credentials.

The operations 600 further include, at block 608, sending a second API request to a service of the cloud provider network, wherein the second API request includes second authentication information generated based on the second security credentials, and wherein the second API request is successfully authenticated and authorized by the cloud provider network.

In some embodiments, the cloud provider network automatically provides the first security credentials and the second security credentials to the software application. In some embodiments, the first security credentials and the second security credentials are automatically provided to the software application by an instance metadata service of the cloud provider network. In some embodiments, the first security credentials and the second security credentials are automatically provided to the software application by an identity provider (IDP) system.

In some embodiments, the operations 600 further include sending a third API request to a service of the cloud provider network, wherein the third API request includes third authentication information generated based on third security credentials; and receiving a response to the third API request, wherein the response indicates to the software application that the request is not permitted based on the third security credentials, and wherein the cloud provider network modified permissions associated with the third security credentials responsive to a determination that security of the third security credentials has been potentially compromised.

In some embodiments, the operations 600 further include sending a third API request to a service of the cloud provider network, wherein the third API request includes third authentication information generated based on third security credentials; and receiving a response to the third API request, wherein the response indicates to the software application that the third security credentials are not valid, and wherein the cloud provider network modified an expiration time associated with the third security credentials responsive to a determination that security of the third security credentials has been potentially compromised.

In some embodiments, the second API request involves a request to perform an action involving a computing resource provided by a service of the cloud provider network, and wherein the request is within permissions of a role associated with the second security credentials.

Figure 7:
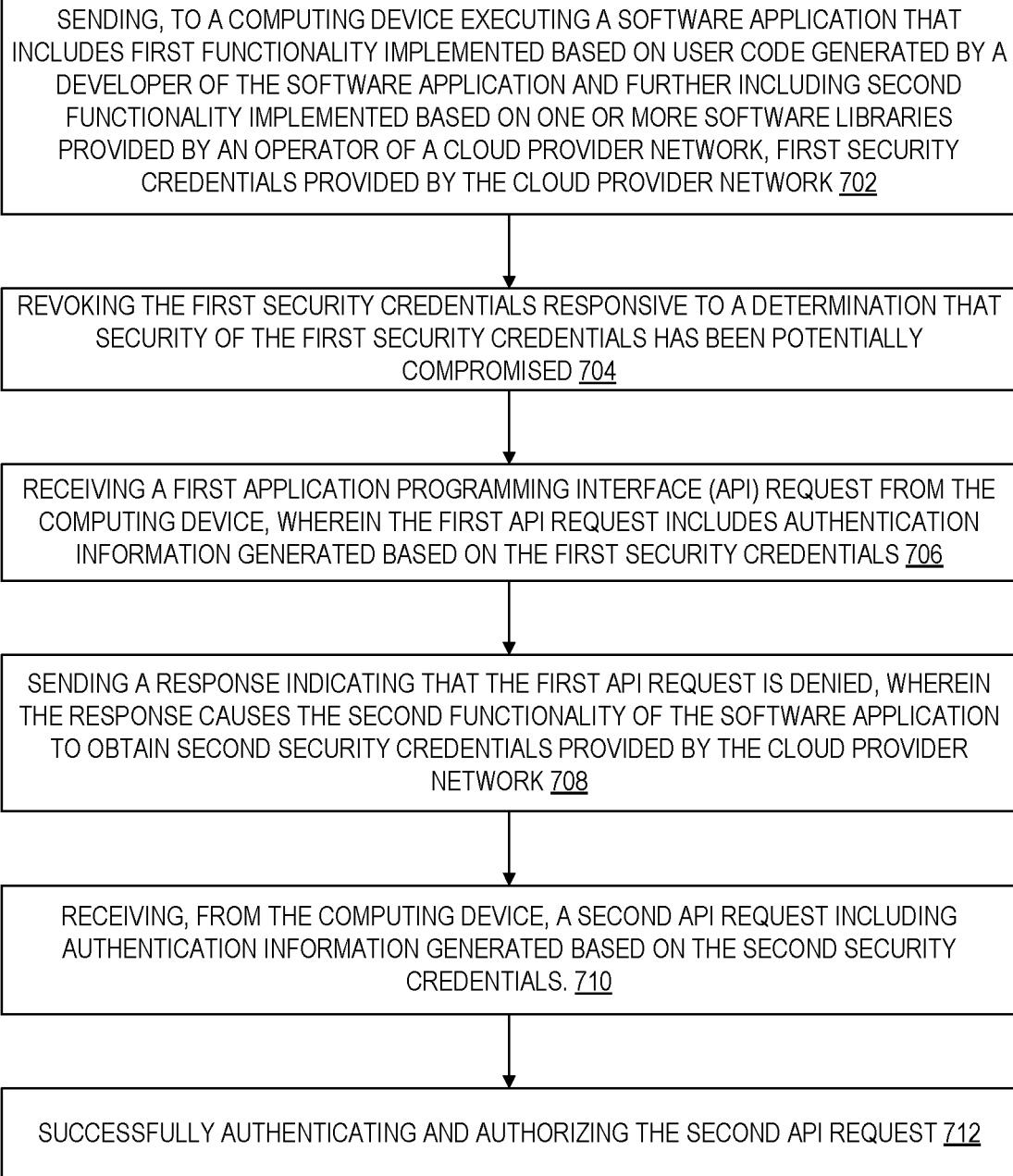
FIG. 7 is a flow diagram illustrating operations of a method enabling a cloud provider network to revoke security credentials responsive to a determination that security of security credentials has been potentially compromised according to some embodiments.

FIG. 7 is a flow diagram illustrating operations 700 of a method for enabling a cloud provider network to provide security credentials to a software application, to revoke security credentials responsive to a determination that security of the security credentials has been potentially compromised, and to provide new security credentials that a software application can use to continue operation with minimal interruption according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by an identity and access management service 102 of the other figures.

The operations 700 include, at block 702, sending, to a computing device executing a software application that includes first functionality implemented based on user code generated by a developer of the software application and further including second functionality implemented based on one or more software libraries provided by an operator of a cloud provider network, first security credentials provided by the cloud provider network.

The operations 700 further include, at block 704, revoking the first security credentials responsive to a determination that security of the first security credentials has been potentially compromised.

The operations 700 further include, at block 706, receiving a first application programming interface (API) request from the computing device, wherein the first API request includes authentication information generated based on the first security credentials.

The operations 700 further include, at block 708, sending a response indicating that the first API request is denied, wherein the response causes the second functionality of the software application to obtain second security credentials provided by the cloud provider network.

The operations 700 further include, at block 710, receiving, from the computing device, a second API request including authentication information generated based on the second security credentials.

The operations 700 further include, at block 712, successfully authenticating and authorizing the second API request.

In some embodiments, the operations further include causing execution of an executable computing resource that is separate from the software application and that is used to make a determination of whether to revoke the first security credentials; and receiving a request from the executable computing resource to revoke the first security credentials, and wherein the first security credentials are revoked based on the request received from the executable computing resource.

In some embodiments, the cloud provider network automatically provides the first security credentials and the second security credentials to the software application.

In some embodiments, the first security credentials and the second security credentials are automatically provided to the software application by an instance metadata service of the cloud provider network.

In some embodiments, the first security credentials and the second security credentials are automatically provided to the software application by an identity provider (IDP) system.

In some embodiments, the cloud provider network revoked the first security credentials responsive to identification of anomalous activity associated with the first security credentials, and wherein the anomalous activity is detected by at least one of: a user of the cloud provider network, a session anomaly detecting application, or a threat detection service of the cloud provider network.

In some embodiments, the operations further include providing, to the computing device, third security credentials; modifying permissions associated with the third security credentials responsive to a determination that security of the third security credentials has been potentially compromised; receiving a third API request from the computing device, wherein the third API request includes third authentication information generated based on the third security credentials; and sending a response to the third API request, wherein the response indicates to the software application that the request is not permitted based on the third security credentials.

In some embodiments, the operations further include providing, to the computing device, third security credentials; modifying an expiration time associated with the third security credentials to obtain a modified expiration time, wherein the expiration time is modified responsive to a determination that security of the third security credentials has been potentially compromised; receiving a third API request from the computing device, wherein the third API request includes third authentication information generated based on the third security credentials, wherein the third API request is generated after the modified expiration time; and sending a response to the third API request, wherein the response indicates to the software application that the request is denied.

In some embodiments, revoking the first security credentials includes adding an identifier of the first security credentials to a session revocation list, wherein the session revocation list stores one or more identifiers of security credentials revoked by the cloud provider responsive to determinations that security of the one or more security credentials has been potentially compromised.

In some embodiments, the second security credentials are temporary security credentials, and wherein the temporary security credentials include a security token storing session information associated with the temporary security credentials.

In some embodiments, the second API request involves a request to perform an action involving a computing resource provided by a service of the cloud provider network, and wherein the request is within permissions of a role associated with the second security credentials.

Figure 8:
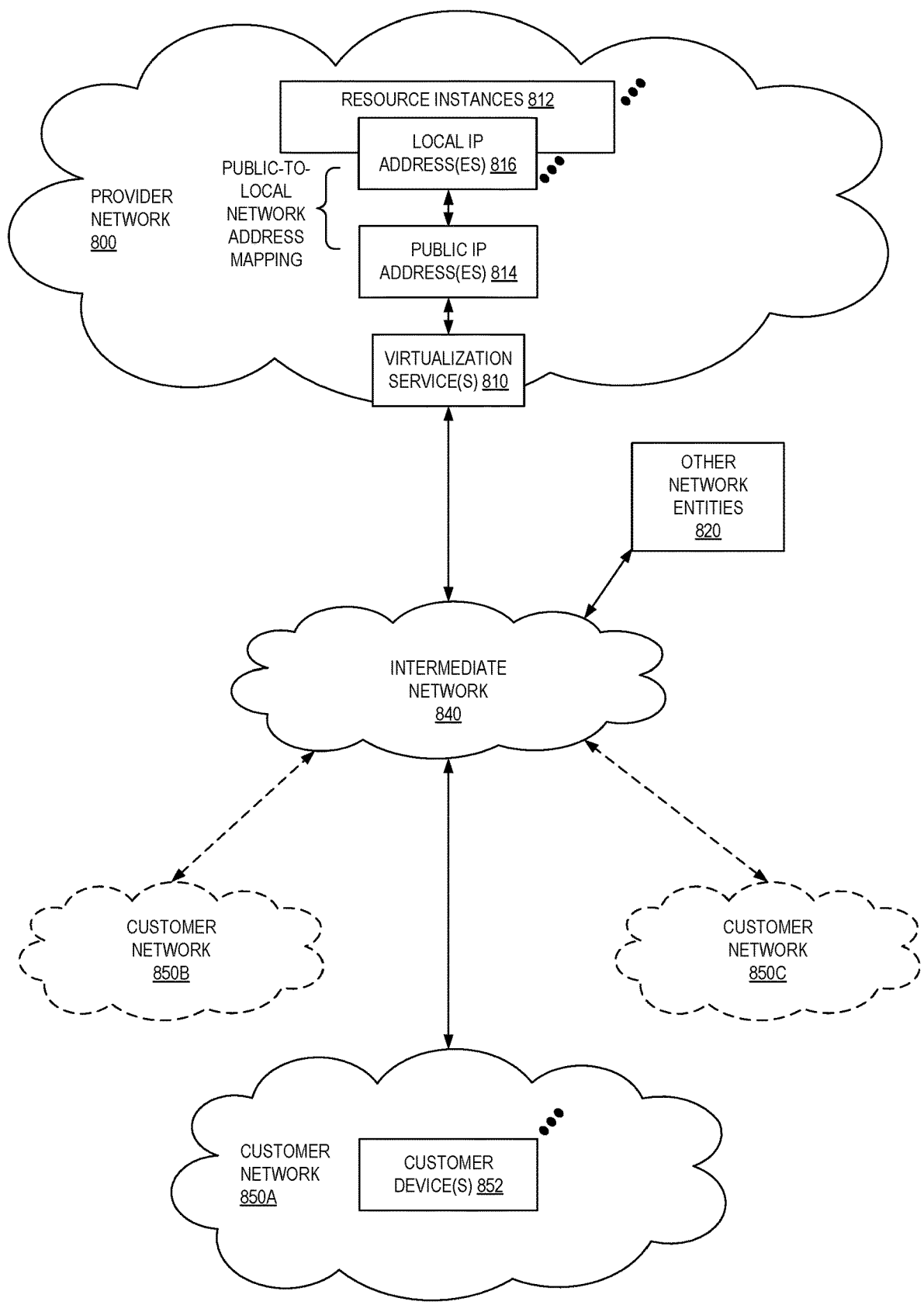
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
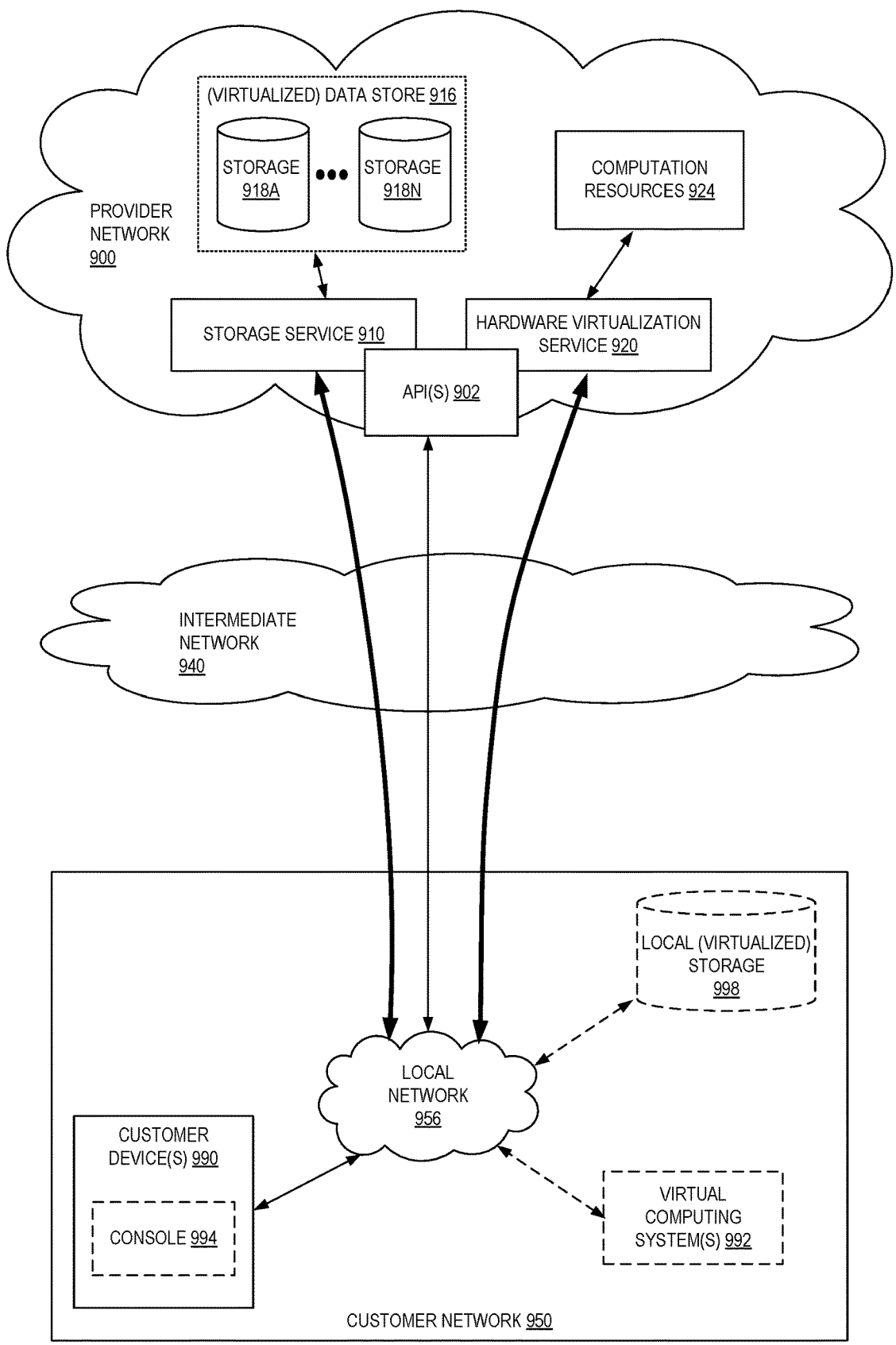
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
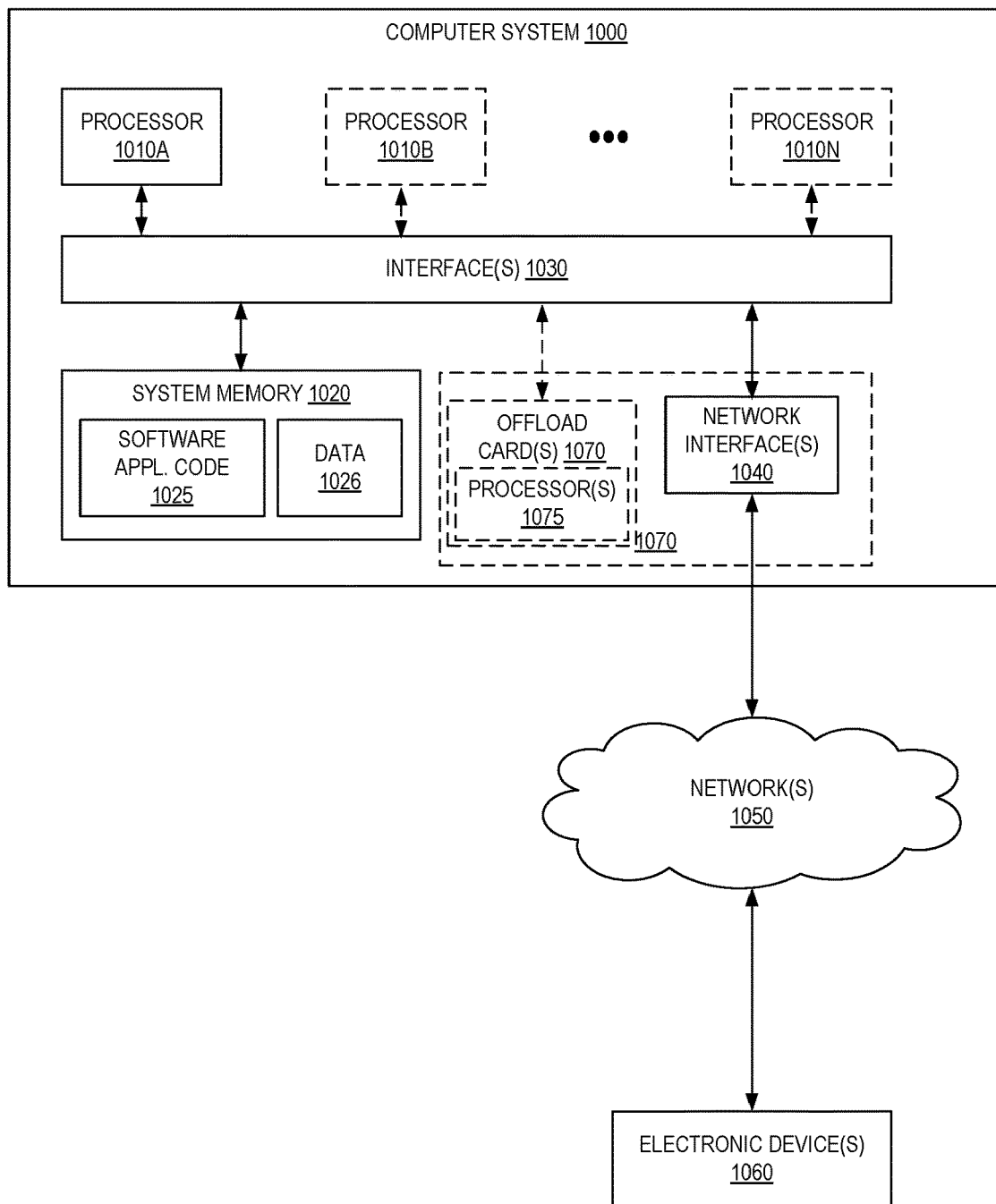
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as software application code 1025 (e.g., executable to implement, in whole or in part, the software application 104) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   sending, by a software application, a first application programming interface (API) request to a service of a cloud provider network, wherein the first API request includes first authentication information generated based on first temporary security credentials obtained by functionality of the software application implemented based on one or more software libraries provided by an operator of the cloud provider network;
   receiving a response to the first API request, wherein the response indicates to the software application that the first API request has been denied by the cloud provider network, and wherein the cloud provider network revoked the first temporary security credentials responsive to a determination that security of the first temporary security credentials has been potentially compromised;
   obtaining, by the functionality of the software application implemented based on the one or more software libraries provided by the operator of the cloud provider network, second temporary security credentials to replace the first temporary security credentials; and
   sending a second API request to a service of the cloud provider network, wherein the second API request includes second authentication information generated based on the second temporary security credentials, wherein the second API request is successfully authenticated and authorized by the cloud provider network.

2. The computer-implemented method of claim 1, wherein the cloud provider network causes execution of an executable computing resource that is separate from the software application and that is used to make a determination of whether to revoke the first temporary security credentials, and wherein the cloud provider network revoked the first temporary security credentials based on a response received from the executable computing resource.

3. The computer-implemented method of claim 1, wherein the first temporary security credentials and the second temporary security credentials are automatically provided to the software application by an instance metadata service of the cloud provider network.

4. A computer-implemented method comprising:
sending, by a software application, a first application programming interface (API) request to a service of a cloud provider network, wherein the first API request includes first authentication information generated based on first security credentials obtained by functionality of the software application implemented based on one or more software libraries provided by an operator of the cloud provider network;
receiving a response to the first API request, wherein the response indicates to the software application that the first API request has been denied by the cloud provider network, and wherein the cloud provider network revoked the first security credentials;
obtaining, by the functionality of the software application implemented based on the one or more software libraries provided by the operator of the cloud provider network, second security credentials to replace the first security credentials; and
sending a second API request to a service of the cloud provider network, wherein the second API request includes second authentication information generated based on the second security credentials, and wherein the second API request is successfully authenticated and authorized by the cloud provider network.

5. The computer-implemented method of claim 4, wherein the cloud provider network causes execution of an executable computing resource that is separate from the software application and that is used to make a determination of whether to revoke the first security credentials, and wherein the cloud provider network revoked the first security credentials based on a response received from the executable computing resource.

6. The computer-implemented method of claim 4, wherein the cloud provider network automatically provides the first security credentials and the second security credentials to the software application.

7. The computer-implemented method of claim 6, wherein the first security credentials and the second security credentials are automatically provided to the software application by an instance metadata service of the cloud provider network.

8. The computer-implemented method of claim 6, wherein the first security credentials and the second security credentials are automatically provided to the software application by an identity provider (IDP) system.

9. The computer-implemented method of claim 4, wherein the cloud provider network revoked the first security credentials responsive to identification of anomalous activity associated with the first security credentials, and wherein the anomalous activity is detected by at least one of: a user of the cloud provider network, a session anomaly detecting application, or a threat detection service of the cloud provider network.

10. The computer-implemented method of claim 4, further comprising:
sending a third API request to a service of the cloud provider network, wherein the third API request includes third authentication information generated based on third security credentials; and
receiving a response to the third API request, wherein the response indicates to the software application that the request is not permitted based on the third security credentials, and wherein the cloud provider network modified permissions associated with the third security credentials responsive to a determination that security of the third security credentials has been potentially compromised.

11. The computer-implemented method of claim 4, further comprising:
sending a third API request to a service of the cloud provider network, wherein the third API request includes third authentication information generated based on third security credentials; and
receiving a response to the third API request, wherein the response indicates to the software application that the third security credentials are not valid, and wherein the cloud provider network modified an expiration time associated with the third security credentials responsive to a determination that security of the third security credentials has been potentially compromised.

12. The computer-implemented method of claim 4, wherein the cloud provider network revokes the first security credentials by adding an identifier of the first security credentials to a session revocation list, wherein the session revocation list stores one or more identifiers of security credentials revoked by the cloud provider network responsive to determinations that security of the one or more security credentials has been potentially compromised.

13. The computer-implemented method of claim 4, wherein the second security credentials are temporary security credentials, and wherein the temporary security credentials include a security token storing session information associated with the temporary security credentials.

14. The computer-implemented method of claim 4, wherein the second API request involves a request to perform an action involving a computing resource provided by a service of the cloud provider network, and wherein the request is within permissions of a role associated with the second security credentials.

15. A system comprising:
a first one or more electronic devices to implement a software application that interacts with a cloud provider network, wherein the software application includes first functionality implemented based on user code generated by a developer of the software application and further includes second functionality implemented based on one or more software libraries provided by an operator of the cloud provider network, and wherein the software application includes instructions that upon execution cause the software application to:
send a first application programming interface (API) request to a service of a cloud provider network, wherein the first API request includes first authentication information generated based on first temporary security credentials obtained by functionality of the software application implemented based on one or more software libraries provided by an operator of the cloud provider network;
receive a response to the first API request, wherein the response indicates to the software application that the first API request has been denied by the cloud provider network, and wherein the cloud provider network revoked the first temporary security credentials responsive to a determination that security of the first temporary security credentials has been potentially compromised;
obtain second temporary security credentials to replace the first temporary security credentials; and
send a second API request to a service of the cloud provider network, wherein the second API request includes second authentication information generated based on the second temporary security credentials, wherein the second API request is successfully authenticated and authorized by the cloud provider network; and a second one or more electronic devices to implement an identity and access management service in the cloud provider network, wherein the identity and access management service includes instructions that upon execution cause the identity and access management service to:
determine that security of the first temporary security credentials has been potentially compromised;
revoke the first temporary security credentials;
send the response to the first API request;
receive the second API request including the second authentication information generated based on the second temporary security credentials; and
successfully validate the second API request.

16. The system of claim 15, wherein the cloud provider network causes execution of an executable computing resource that is separate from the software application and that is used to make a determination of whether to revoke the first temporary security credentials, and wherein the cloud provider network revoked the first temporary security credentials based on a response received from the executable computing resource.

17. The system of claim 15, wherein the cloud provider network automatically provides the first temporary security credentials and the second temporary security credentials to the software application.

18. The system of claim 15, wherein the first temporary security credentials and the second temporary security credentials are automatically provided to the software application by an instance metadata service of the cloud provider network.

19. The system of claim 15, wherein the first temporary security credentials and the second temporary security credentials are automatically provided to the software application by an identity provider (IDP) system.

20. The system of claim 15, wherein the cloud provider network revoked the first temporary security credentials responsive to identification of anomalous activity associated with the first temporary security credentials, and wherein the anomalous activity is detected by at least one of: a user of the cloud provider network, a session anomaly detecting application, or a threat detection service of the cloud provider network.

* * * * *